United States Patent
Fujita et al.

(10) Patent No.: US 8,295,160 B2
(45) Date of Patent: Oct. 23, 2012

(54) DATA COMMUNICATION SYSTEM, DEVICE AND METHOD OF DETECTING A FAILURE ON AN ACCESS LINE IN A NETWORK

(75) Inventors: Manabu Fujita, Yokohama (JP); Masaya Arai, Atsugi (JP); Ken Watanabe, Kawasaki (JP); Kensuke Ino, Yokohama (JP)

(73) Assignee: Alaxala Networks Corporation, Kanagawa (JP)

( * ) Notice: Subject to any disclaimer, the term of this patent is extended or adjusted under 35 U.S.C. 154(b) by 1413 days.

(21) Appl. No.: 11/471,656

(22) Filed: Jun. 21, 2006

(65) Prior Publication Data

US 2007/0171817 A1    Jul. 26, 2007

(30) Foreign Application Priority Data

Jan. 24, 2006    (JP) ................................ 2006-014686

(51) Int. Cl.
   *G06F 11/16* (2006.01)
(52) U.S. Cl. ............................ 370/217; 398/2; 709/239
(58) Field of Classification Search .................. 370/216, 370/217, 218, 219, 220, 221, 22; 398/1–8; 709/238–239
   See application file for complete search history.

(56) References Cited

U.S. PATENT DOCUMENTS 7,359,331 B2    4/2008    Takamichi

| 2004/0037296 | A1* | 2/2004 | Kim et al. ................ 370/395.53 |
| 2007/0008982 | A1* | 1/2007 | Voit et al. ...................... 370/401 |
| 2008/0037436 | A1* | 2/2008 | Liu ............................... 370/250 |

FOREIGN PATENT DOCUMENTS

| CN | 1525671 A | 9/2004 |
| JP | 2003-298632 | 10/2003 |

OTHER PUBLICATIONS

"Virtual Private LAN Services over MPLS draft-ietf-12vpn-vpls-1dp-04.txt", Internet Draft Document, Aug. 2004.
D. Katz, D. Ward, "Bidirectional Forwarding Detection", Internet Draft, pp. 1-29, Aug. 31, 2003, http://tools.ietf.org/html/draft-katz-ward-bfd-01.
English language translation of Notification of Reason for Rejection dated Apr. 13, 2010, issued in corresponding Japanese Patent Application No. 2006-014686.
Katsuhito Asano, Fujitsu Ltd, psuedo wire, MPLS Japan, Oct. 20, 2003, pp. 1-34 along with an English language description of the relevancy of the document.

* cited by examiner

*Primary Examiner* — Habte Mered
(74) *Attorney, Agent, or Firm* — Brundidge & Stanger P.C.

(57) ABSTRACT

When the provider edge PE1 detects the occurrence of a failure at the access line AL1, it sends the label withdraw message to the virtual circuit VC1, and when the provider edge PE2 receives the label withdraw message sent via the virtual circuit VC1, the access line AL2 is put to a link down state, and when the customer edge CE2 detects the link down state of the access line AL2, it switches from the normal path to the redundant path.

10 Claims, 11 Drawing Sheets

DATA COMMUNICATION SYSTEM, DEVICE AND METHOD OF DETECTING A FAILURE ON AN ACCESS LINE IN A NETWORK

INCORPORATION BY REFERENCE

The present application claims priority from Japanese application JP2006-14686 filed on Jan. 24, 2006, the content of which is hereby incorporated by reference into this application.

BACKGROUND OF THE INVENTION

1. Field of the Invention

The present invention relates to technology for notifying the occurrence of a failure when failure occurs on an access line connected with a network.

2. Description of the Related Art

In the past, using an MPLS (Multiprotocol Label Switching) network of a service provider (SP) between a certain customer site and another customer site, VPWS (Virtual Private Wire Service) is known as a service for performing point-to-point data communication via a layer 2 VPN (Virtual Private Network).

Figure 10:
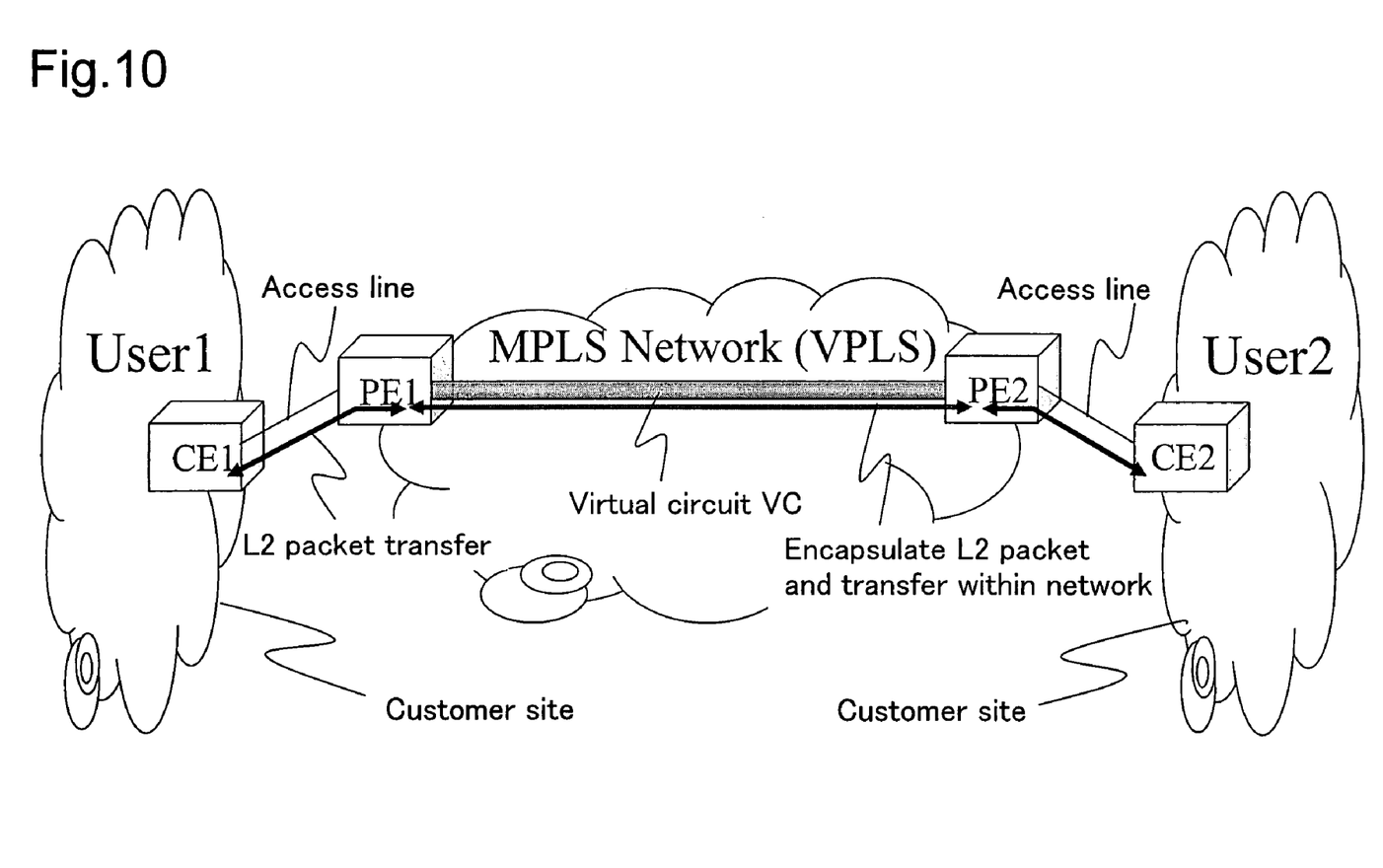
FIG. 10 is an explanatory drawing showing an example of a network using a typical VPWS.

FIG. 10 is an explanatory drawing showing an example of a network for which a typical VPWS is used. As shown in FIG. 10, with VPWS, there is an MPLS network between the User 1 which is one customer site and the User 2 which is the other customer site (following, called the VPWS network). Of these, for the one customer site User 1, the network devices such as a switch, router, and the like at the edge part of this (hereafter called the customer edge) CE1 and for the VPWS network, the network devices such as a switch, router, and the like at the other edge part (hereafter called the provider edge) PE1 are connected using an access line, and similarly, for the other customer site User 2, the customer edge CE2 at the edge part, and for the VPWS network, the provider edge PE2 at the other edge part are also connected using an access line. Then, the mutual access lines that connect between CE and PE (in other words, the provider edges PE1 and PE2) are connected point-to-point by an affiliated virtual circuit VC within the VPWS network.

For a VPWS network with this kind of constitution, for example, a layer 2 packet sent from one customer site User 1 is transferred to the provider edge PE1 via the access line from that customer edge CE1, and next, this is transferred to the provider edge PE2 via the virtual circuit VC from the provider edge PE1, and furthermore, is transferred to the customer edge CE2 via the access line from the provider edge PE2, and is received by the other customer site User 2. At this time, the layer 2 packet is encapsulated within the virtual circuit VC and transferred.

So then, for this kind of VPWS network, when building a so-called redundant structure, a structure for which a substitute path is prepared in case of network failure, for example with layer 2, by operating STP (Spanning Tree Protocol) that is the redundancy control protocol between the customer edges (CE1-CE2), it is possible to realize a redundant structure, and with layer 3, by operating the routing protocol that represents the OSPF (Open Shortest Path First) or BGP (Border Gateway Protocol), and at each customer edge, by setting the normal path and the redundant path, it is possible to realize a redundant structure.

Figure 11:
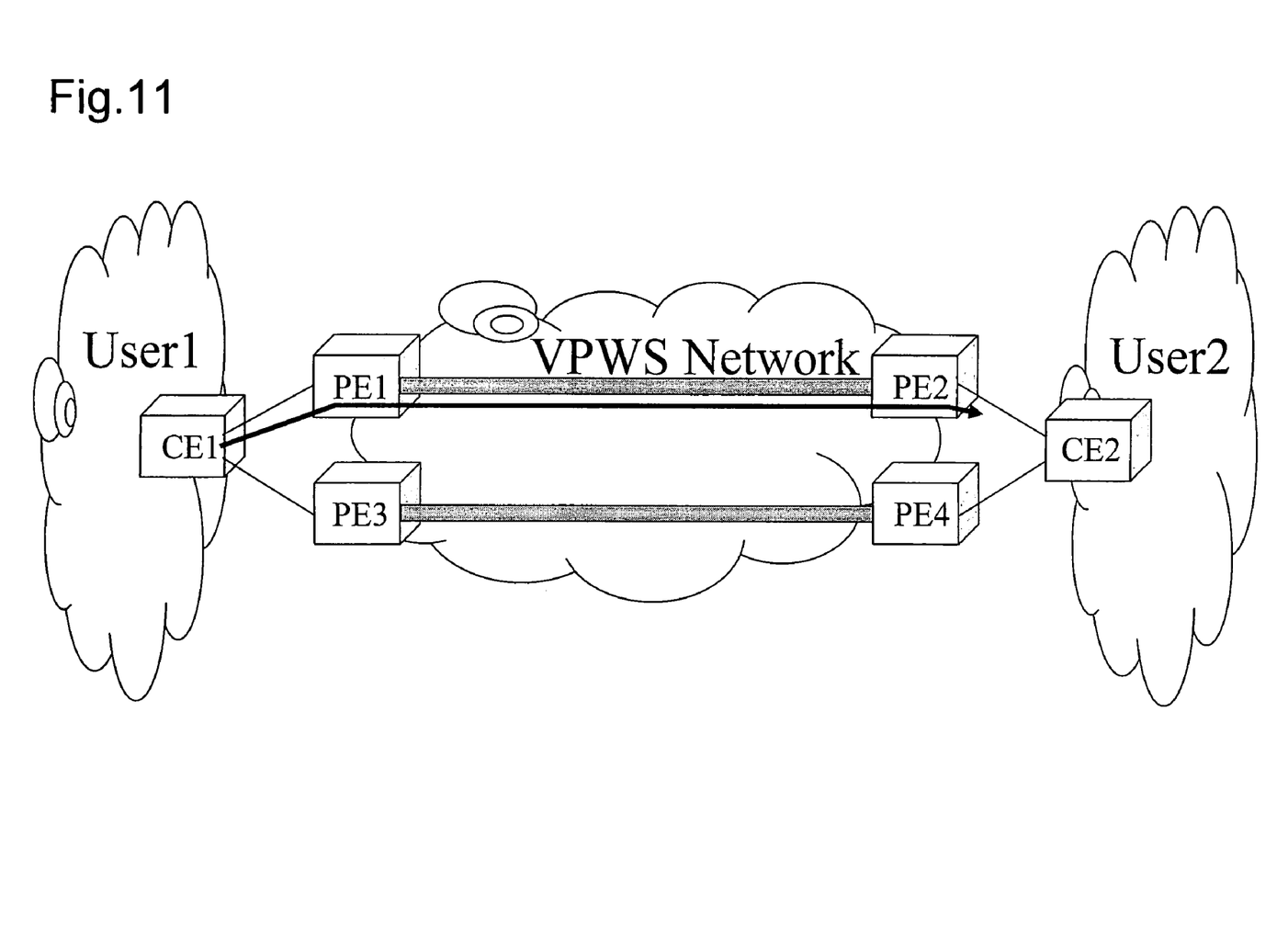
FIG. 11 is an explanatory drawing showing an example of a network for which a redundant structure is built for a VPWS network.

FIG. 11 is an explanatory drawing showing an example of a network for which a redundant structure is built for the VPWS network. In FIG. 11, PE3 and PE4 are both provider edges, and these provider edges PE3 and PE4, the same as with the provider edges PE1 and PE2, within the VPWS network, these are connected point-to-point by an affiliated virtual circuit VC. Then, the redundant path that is a substitute path is constituted using CE1-PE3-PE4-CE2. As an item related to this type of technology, in the past, the item noted in Japanese Patent Laid-Open Gazette No. 2003-298632 is known, for example.

For the concerned redundant structure, within the normal path of CE1-PE1-PE2-CE2, when failure occurs, when the customer edges CE1 and CE2 detect this, by switching from the normal path to the redundant path, it is possible to keep continuity of the communication.

However, in this way, when the redundant structure is realized at the VPWS network, there were the following kinds of problems. For example, at the access line between CE1 and PE1, when failure occurs, at the customer edge CE1, since there is failure at its own access line, it is possible to detect that failure occurrence, and to immediately switch to the redundant path, but with the other customer edge CE2, since there is failure at the other party access line, to detect the failure with the aforementioned redundancy control protocol, the timeout time stipulated in the redundancy control protocol is required, so there was the problem that it was not possible to immediately switch to the redundant path.

In light of this, in the prior art, to detect failure occurrence at the other party access line, a reachability verification protocol was operated between the customer edges (between CE1 and CE2). Specifically, between the customer edges (between CE1 and CE2), an echo packet stipulated by that protocol is sent and received, for example when failure occurs at the access line between CE1 and PE1, the echo packet from the customer edge CE1 is stopped, and at the customer edge CE2, by detecting the timeout of that echo packet, that failure occurrence is detected.

SUMMARY OF THE INVENTION

However, as noted above, between the customer edges (between CE1 and CE2), when failure occurrence was detected by operating the reachability verification protocol, there were the following kinds of problems.

Specifically, as the reachability verification protocol, for example when using the reachability monitoring function (called static polling) by periodically sending and receiving an echo request and echo reply message of ICMPv4/ICMPv6 between the customer edges (between CE1 and CE2), after a failure occurs at the other party access line, an actual timeout is detected, and until the failure occurrence is detected, about a few seconds of time are required, so there was the problem that it took too much time for detection of failure occurrence.

Also, to shorten the time it takes for failure occurrence detection, one possibility is to shorten the control frame, in other words, the echo packet sending and receiving interval, and to shorten the timeout of the echo packet, but by working in this way, there is frequent exchange of echo packets, so there is the problem of the communication bandwidth within the network becoming compressed.

Therefore, the object of the present invention is to solve the aforementioned problems of the prior art, and to provide a technology that can shorten the time it takes to detect failure occurrence without compressing the communication bandwidth within the network when a failure occurs with the other party access line.

At least part of the above and the other related objects is attained by a first data communication system for performing data communication between a second and third network via a first network. The first data communication system comprises:

a first edge of the first network;

a second edge of the first network connected to the first edge via a first virtual circuit of the first network;

a third edge of the first network;

a fourth edge of the first network connected to the third edge via a second virtual circuit of the first network;

a fifth edge of the second network connected to the first edge via a first access line and connected to the third edge via a third access line; and a sixth edge of the third network connected to the second edge via a second access line and connected to the fourth edge via a fourth access line;

wherein a path that passes through the fifth edge, the first edge, the second edge, and the sixth edge is constituted as a normal path, and a path that passes through the fifth edge, the third edge, the fourth edge, and the sixth edge is constituted as a redundant path, the first edge sends a virtual circuit withdraw message to the first virtual circuit when the first edge detects an occurrence of failure at the first access line, the second edge puts the second access line into a link down state when the second edge receives the virtual circuit withdraw message sent via the first virtual circuit, and the sixth edge switches from the normal path to the redundant path when the sixth edge detects the link down of the second access line.

In this way, with the first data communication system, between the fifth edge and the sixth edge, because the reachability verification protocol is not operated, within the first network there is no exchange of echo packets, and also, when failure occurs with the first access line, within the first network, using the virtual circuit withdraw message, notification of that failure occurrence is given from the first edge to the second edge. Therefore, according to the first data communication system, it is possible to notify failure occurrence in a short time without compressing the communication bandwidth with the first network.

Also, when the second edge receives the virtual circuit withdraw message, the second edge immediately puts the second access line into the link down state, and by doing this, at the sixth edge, the link down state of the second access line is detected, and because failure occurrence at the first access line which is the other party access line is detected, it is possible to shorten the time it takes to notify failure occurrence.

The present invention is also directed to a second data communication system for performing data communication between a second and third network via a first network. The data communication system comprises:

a first edge of the first network;

a second edge of the first network connected to the first edge via a first virtual circuit of the first network;

a third edge of the first network;

a fourth edge of the first network connected to the third edge via a second virtual circuit of the first network;

a fifth edge of the second network connected to the first edge via a first access line and connected to the third edge via a third access line; and a sixth edge of the third network connected to the second edge via a second access line and connected to the fourth edge via a fourth access line;

wherein a path that passes through the fifth edge, the first edge, the second edge, and the sixth edge is constituted as a normal path, and a path that passes through the fifth edge, the third edge, the fourth edge, and the sixth edge is constituted as a redundant path, at least the BFD (Bidirectional Forwarding Detection), which is the reachability verification protocol, is operated between the first edge and the fifth edge and is operated between the second edge and the sixth edge, the first edge sends a virtual circuit withdraw message to the first virtual circuit, when a failure occurs at the first access line and the first edge detects the failure occurrence by the BFD, the second edge stops sending of the BFD echo/control packet to the second access line when the second edge receives the virtual circuit withdraw message sent via the first access line, and the sixth edge switches from the normal path to the redundant path when the sixth edge detects timeout of the BFD echo/control packet for the second access line.

Therefore, with the second data communication system, by operating the BFD between the first edge and the fifth edge and between the second edge and the sixth edge, even if the failure that occurs at the access line is a failure other than link down such as a one-line disconnect or the like, it is possible for each edge connected to that access line to detect that failure occurrence.

Also, between the first edge and the second edge, because the BFD is not operated, there is no exchange of echo packets within the first network. Also, when failure occurs with the first access line, within the first network, using the virtual circuit withdraw message, that failure occurrence is notified from the first edge to the second edge. Therefore, according to the second data communication system, it is possible to notify failure occurrence in a short time without compressing the communication bandwidth within the first network.

Also, when the second edge receives the virtual circuit withdraw message, the second edge immediately stops sending of the BFD echo/control packet to the second access line, and by doing this, with the sixth edge, the timeout for that echo/control packet for the second access line is detected, and because the failure occurrence of the first access line which is the other party access line is detected, it is possible to significantly shorten the time taken for detecting failure occurrence.

The present invention is further directed to a third data communication system for performing data communication between a second and third network via a first network. The data communication system comprises:

a first edge of the first network;

a second edge of the first network connected to the first edge via a first virtual circuit of the first network;

a third edge of the first network;

a fourth edge of the first network connected to the third edge via a second virtual circuit of the first network;

a fifth edge of the second network connected to the first edge via a first access line and connected to the third edge via a third access line; and a sixth edge of the third network connected to the second edge via a second access line and connected to the fourth edge via a fourth access line;

wherein a path that passes through the fifth edge, the first edge, the second edge, and the sixth edge is constituted as a normal path, and a path that passes through the fifth edge, the third edge, the fourth edge, and the sixth edge is constituted as a redundant path, the BFD (Bidirectional Forwarding Detection), which is the reachability verification protocol, is operated between the first edge and the fifth edge, and the BFD is operated between the second edge and the sixth edge, the first edge sends a virtual circuit withdraw message to the first virtual circuit, when a failure occurs at the first access line and the first edge detects the failure occurrence by the BFD, the second edge sends a notification of a down state by the BFD control packet to the second access line when the second edge receives the virtual circuit withdraw message sent via the first access line, and the sixth edge switches from the normal path to the redundant path when the sixth edge receives the notification of the down state by the BFD control packet.

Therefore, with the third data communication system, the same as with the second data communication system, by the BFD being operated, even if the failure that occurs at the access line is a failure other than link down, each edge connected to that access line is able to detect that failure occurrence.

Also, the same as with the second data communication system, the BFD is not operated between the first edge and the second edge, and when a failure occurs at the first access line, using the virtual circuit withdraw message, notification of the failure occurrence is made to be given from the first edge to the second edge, so it is possible to do notification of the failure occurrence in a short time without compression of the communication bandwidth within the first network.

Also, when the second edge receives the virtual circuit withdraw message, the second edge immediately notifies the second access line of the down state by the BFD control packet, and by doing that, with the sixth edge, that notification is received and notification of the failure occurrence of the first access circuit which is the other party access line is given, so it is possible to significantly shorten the time taken for failure occurrence notification.

For the data communication system of the present invention, it is preferable to form the first network from a VPWS (Virtual Private Wire Service) network.

This is because the VPWS is suitable when performing point-to-point data communication via the VPN (Virtual Private Network).

Also, for the data communication system of the present invention, it is preferable that the virtual circuit withdraw message be the label withdraw message stipulated by the LDP (Label Distribution Protocol) which is the label distribution protocol.

With the MPLS (Multiprotocol Label Switching) network which is the VPWS base, the LDP is suitable as the label distribution protocol, and this is because it is easy to use that control message.

Note that in addition to the aforementioned data communication system, the present invention can be realized with an aspect as the network device that constitutes that data communication system.

DETAILED DESCRIPTION OF THE INVENTION

Following, aspects of the invention are described based on embodiments in the following sequence.
A. First Embodiment:
    A-1: Constitution of the Embodiment:
    A-2: Normal Communication Operation:
    A-3: Operation During Access Line Failure Occurrence:
    A-4: Effect of the Embodiment:
B. Second Embodiment:
    B-1: Constitution of the Embodiment:
    B-2: Operation During Access Line Failure Occurrence:
    B-3: Effect of the Embodiment:
C. Variation Example:

A. First Embodiment

A-1: Constitution of the Embodiment

Figure 1:
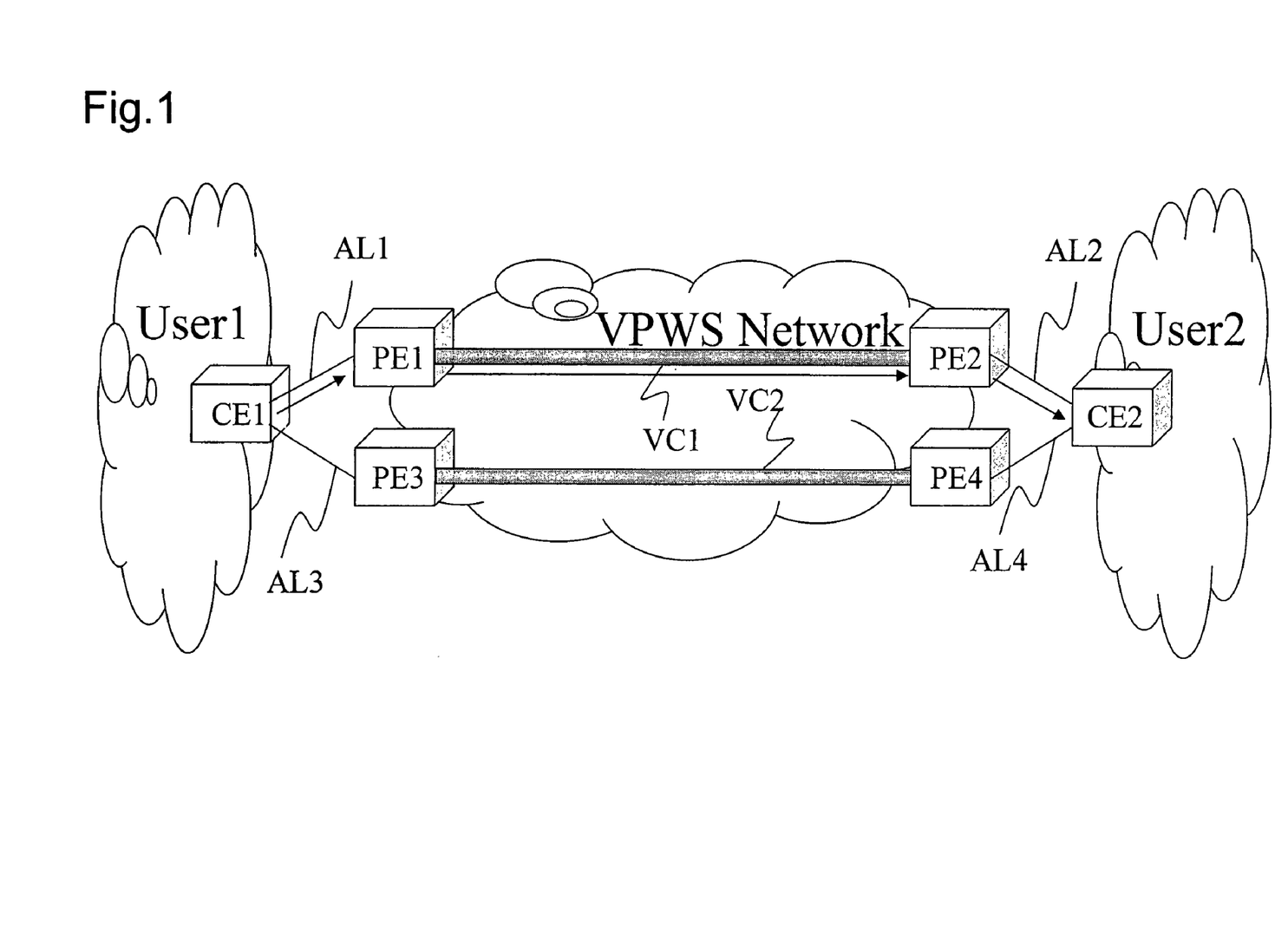
FIG. 1 is an explanatory drawing showing a network for which the data communication system is applied as the first embodiment of this invention.

FIG. 1 is an explanatory drawing showing a network for which the data communication system is applied as the first embodiment of this invention.

With this embodiment, as shown in FIG. 1, between User 1 which is one customer site and User 2 which is another customer site, there is a VPWS network which is an MPLS network of the service provider (SP), and for the one customer site User 1, between the customer edge CE1 which is at its edge part and the provider edge PE1 which is at one edge part at the VPWS network is connected by the access line AL1, and similarly, for the other customer site User 2, between the customer edge CE2 at the edge part and the provider edge PE2 at the other edge part at the VPWS network is also connected by the access line AL2. The access lines AL1 and AL2 that connect between CE and PE are connected point-to-point by an affiliated virtual circuit VC1 within the VPWS network. Then, the normal path that performs actual communication is constituted using CE1-PE1-PE2-CE2.

With this kind of constitution, between the customer sites, via the layer 2 VPN, the service that performs point-to-point data communication, specifically VPWS, is realized.

Also, with this VPWS network, to build a constitution that prepares a substitute path in case of network failure, a so-called redundant structure, the redundancy control protocol is operated between the customer edges (CE1-CE2). Specifically, the provider edges PE3 and PE4, the same as with the provider edges PE1 and PE2, are connected point-to-point by the affiliated virtual circuit VC2 within the VPWS network, and the customer edge CE1 and the provider edge PE3 are connected by the access line AL3 and the customer edge CE2 and the provider edge PE4 are connected by the access line AL4, and the redundant path which is the substitute path is constituted by CE1-PE3-PE4-CE2.

Figure 2:
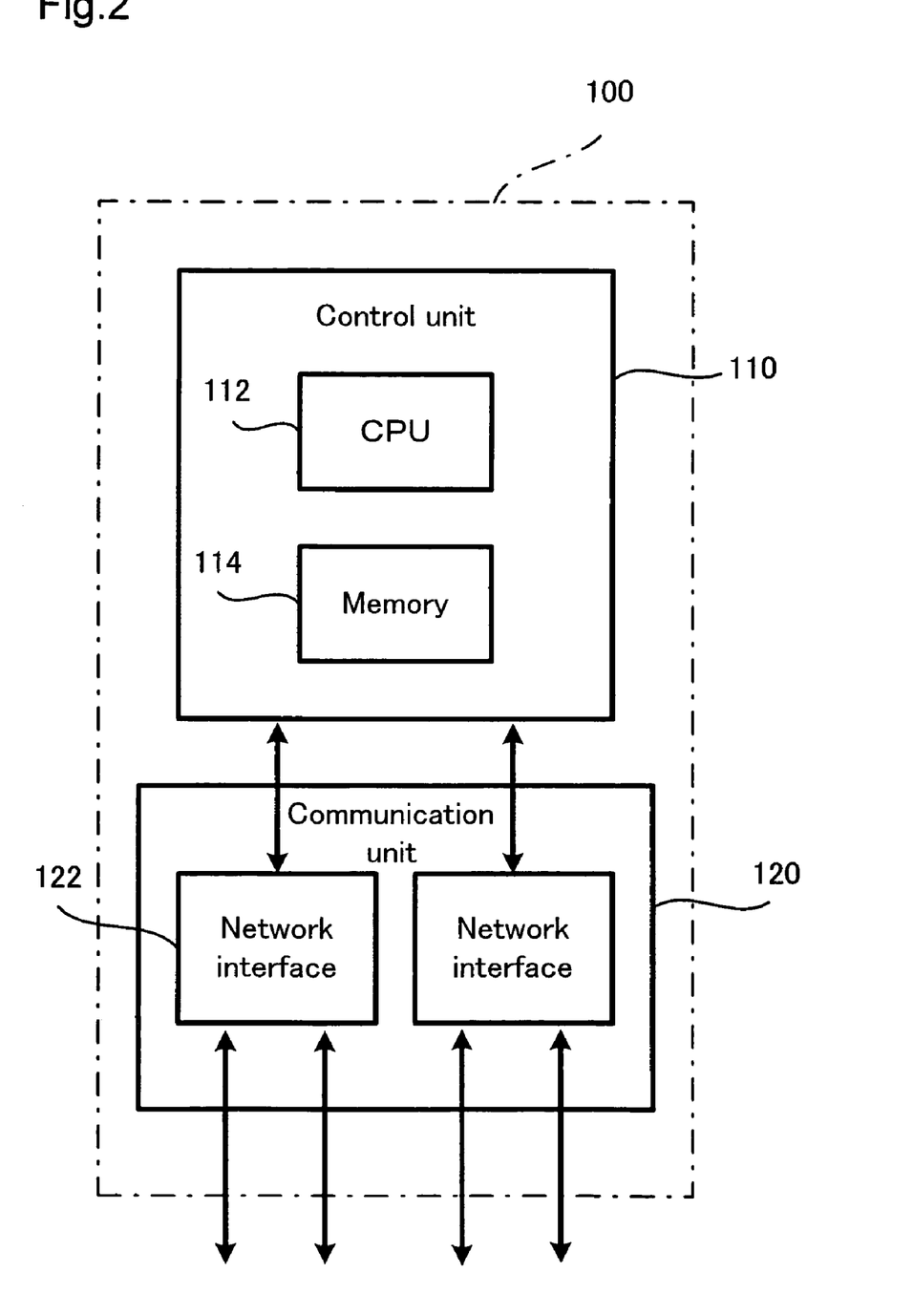
FIG. 2 is a block diagram showing the constitution of the switch that can be used as the customer edge and the provider edge.

Note that the customer edges CE1 and CE2 and the provider edges PE1 and PE2 are network devices such as the layer 2 switch, router, or the like, and for example, in the case of a switch, are constituted as shown in FIG. 2.

FIG. 2 is a block diagram showing the constitution of the switch that can be used as the customer edge and the provider edge. As shown in FIG. 2, the switch 100 is mainly equipped with the control unit 110 and the communication unit 120. Of these, the control unit 110 is equipped with a CPU 112, a memory 114 and the like, and by the CPU 112 executing a program stored within the memory 114, device general management and packet processing and the like are performed. Also, the communication unit 120 is equipped with a network interface 122 and the like, and this performs suspension processing or the like of the packet at the second layer (data link layer) of the OSI reference model. Each network interface 122 is connected to a physical line (twisted pair cable, optical fiber, etc.) such as an Ethernet™ via a port (not illustrated).

Generally, within the MPLS network (VPWS network), each network device containing the provider edge mutually exchanges label information corresponding to the FEC (Forwarding Equivalence Class), and for that label information exchange, as the label distribution protocol, LDP (Label Distribution Protocol) is used. Therefore, for this embodiment as well, LDP is operated between the provider edges (PE1-PE2).

Also, with this LDP, as one control message, the virtual circuit withdraw message which is called Withdraw is stipulated. For this embodiment, as described later, using the Label Withdraw message for this LDP, notification is given of failure that occurred at the access line.

A-2: Normal Communication Operation

With normal communication, for example as shown by the arrows in FIG. 1, the layer 2 packet sent from the one customer site User 1 is transferred to the provider edge PE1 via the access line AL1 from the customer edge CE1, and next, is transferred from the provider edge PE1 to the provider edge PE2 via the virtual circuit VC1, and furthermore, is transferred from the provider edge PE1 to the customer edge CE2 via the access line AL2, and is received by the other customer site User 2. At this time, within the virtual circuit VC1, the layer 2 packet is encapsulated and transferred.

A-3: Operation During Access Line Failure Occurrence

Figure 3:
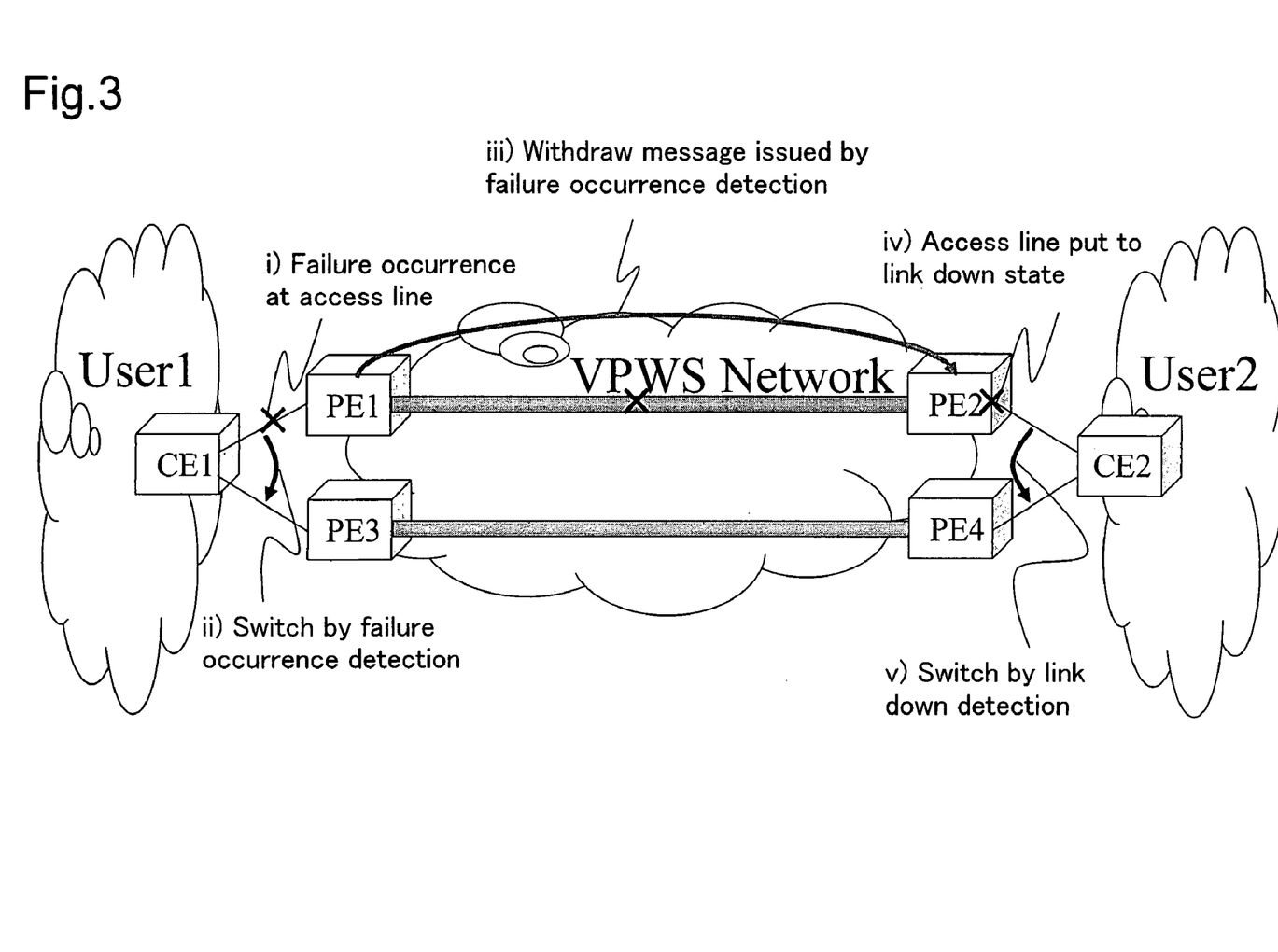
FIG. 3 is an explanatory drawing showing the operation contents during access line failure occurrence for the first embodiment of this invention.

FIG. 3 is an explanatory drawing showing the operation contents during access line failure occurrence for the first embodiment of this invention.

In light of this, for example as shown in FIG. 3, for the access line AL1 between CE1 and PE1, when a link down failure occurs (step i), with the control unit of the customer edge CE1, since this is a failure of its own access line AL1, that failure occurrence is detected, and the redundancy control protocol operating with the customer edge CE1 switches from the normal path to the redundant path (step ii). Meanwhile, with the control unit of the provider edge PE1 as well, since this is a failure of its own access line AL1, that failure occurrence is detected. With the control unit of the provider edge PE1, when it is detected that an access line AL1 failure has occurred, the virtual circuit VC1 constructed between PE1 and PE2 by the aforementioned LDP is put to a down state, and a Label Withdraw message is issued to PE2 (step iii).

Figure 4:
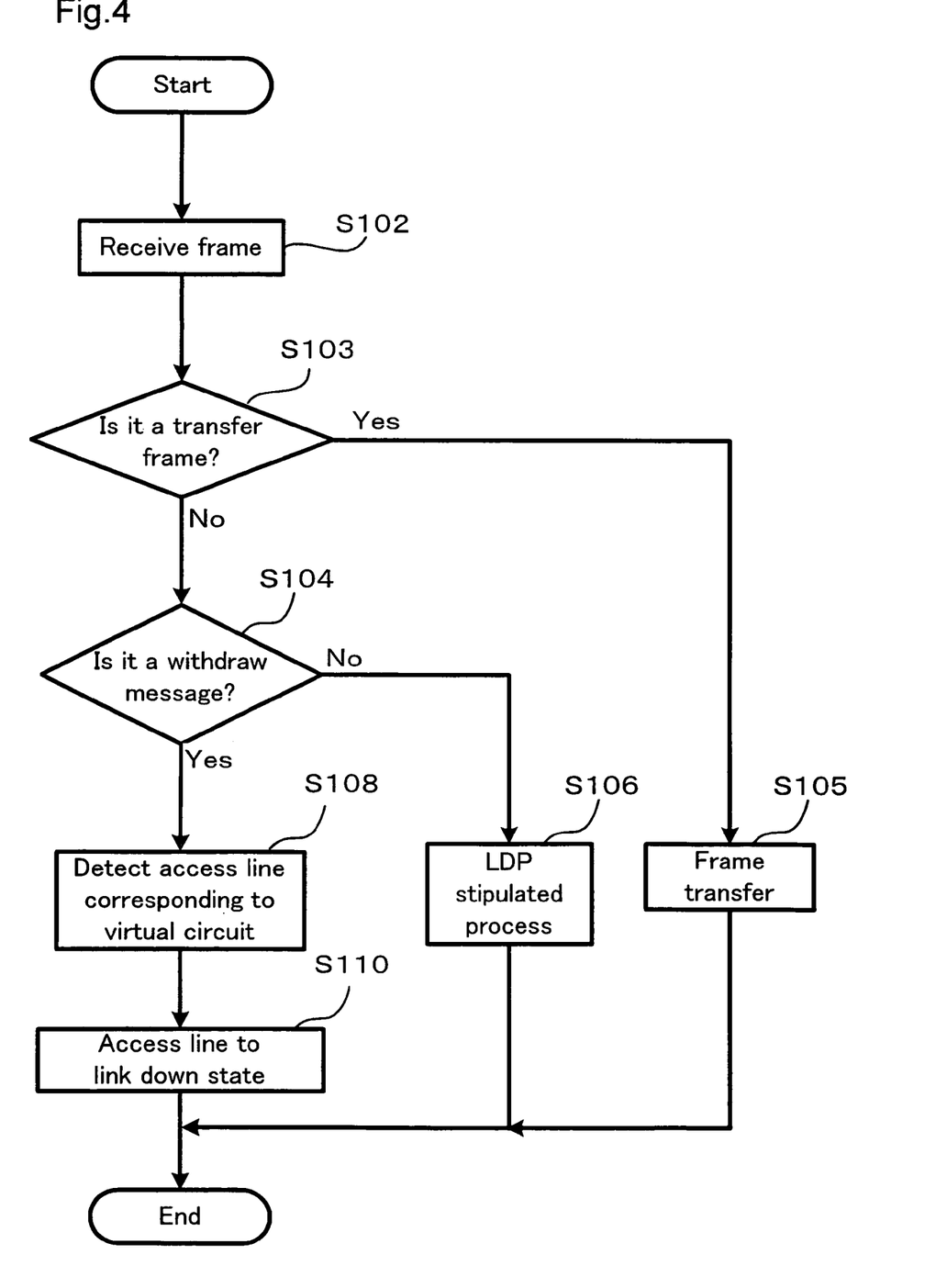
FIG. 4 is a flow chart showing the process operation of the provider edge PE2 for the first embodiment of the invention.

In contrast to this, the control unit of the other provider edge PE2 performs the process operation as shown in FIG. 4. FIG. 4 is a flow chart showing the process operation of the provider edge PE2 for the first embodiment of the invention.

When the process shown in FIG. 4 is started, when a frame is received via the circuit (step S102), the control unit of the provider edge PE2 judges whether or not that frame is a transfer frame (step S103), and when it is a transfer frame, performs frame transfer (step S105), and ends the series of processes. When it is not a transfer frame, a judgment is made of whether or not the label withdraw message is contained in that frame (step S104), and when it is not contained, the LDP stipulated process is executed (step S106), and the series of processes ends. On the other hand, when the label withdraw message is contained in the received frame, the access line AL2 corresponding to the virtual circuit VC1 to which that label withdraw message was sent is detected (step S108), the access line AL2 between PE2 and CE2 obtained by the detection is put to a link down state (step S110, FIG. 3 step iv), and the series of processes ends.

As a result, with the control unit of the customer edge CE2 connected to the access line AL2, the fact that its own access line AL1 is in a link down state is detected, and the redundancy control protocol that operates with the customer edge CE2 switches from the normal path to the redundant path (step v).

A-4: Effect of the Embodiment

As described above, with this embodiment, between the customer edges (between CE1 and CE2), the reachability verification protocol is not operated, so within the MPLS network (VPWS network), echo packets are not exchanged, and when a link down failure has occurred with the other party access line, within the MPLS network (VPWS network), using the LDP label withdraw message, notification of the occurrence of that failure is given from one provider edge to the other provider edge. Therefore, with this embodiment, it is possible to give notification in a short time from the occurrence of the failure without compressing the communication bandwidth in the network.

Also, the provider edge that receives the label withdraw message immediately links down its own access line, and by doing this, at the customer edge, the fact that its own access line is in a link down state is detected, and because the failure occurrence at the other party access line is detected, it is possible to shorten the time taken for failure occurrence detection.

Also, when the provider edge receives the label withdraw message, it must introduce a new process of doing a link down of its own access line, but for other than the provider edge, the same processing contents as the prior art is sufficient, so it is possible to realize this easily.

B. Second Embodiment

Now then, for the first embodiment noted above, the provider edge and the customer edge, when a link down failure occurred at their own access line, detected that failure occurrence, and it was possible to perform the processes of step ii and step iii, but for failure other than link down, for example when a failure such as one line disconnect occurs, it is not possible to detect that failure occurrence.

In light of this, for the second embodiment of this invention, by using the BFD (Bidirectional Forwarding Detection) which is the reachability verification protocol, even when a failure such as one line disconnect occurs, it is possible to detect that failure occurrence. Note that here, one-line disconnect means a state of one of the lines being disconnected when the sending line and the receiving line are different lines.

B-1: Constitution of the Embodiment

The basic constitution of this embodiment is the same as the constitution of FIG. 1, so the description for that is omitted.

For this embodiment, the point that differs from the first embodiment is the point that the BFD which is the reachability verification protocol is operated between each CE and PE.

As the BFD function, generally, there is the function of monitoring failure of the path (line) that connects two transfer engines and the failure of the transfer engine itself with both directions (sending and receiving). Also, as a feature of BFD, compared to the existing reachability verification protocol, it is possible to detect failure occurrence in a very short time (millisecond units), and there is the feature that it is possible to perform switching to the redundant path at high speed.

However, the BFD application range, at this time, is only layer 3, so as seen with this embodiment, when layer 2 is used, it is not possible to apply this as is. For example, even if the BFD packet is transferred from the customer edge CE2 to the provider edge PE2, with the provider edge PE2, it is not possible to recognize that this is a BFD packet, so that packet is suspended, and there is the problem that it is transferred elsewhere.

In light of this, with this embodiment, to recognize that this is a BFD packet at the provider edge and the customer edge, the following kind of reform is implemented on the BFD packet at the sending source edge.

Specifically, at the sending source customer edge or provider edge, at the BFD packet to be transferred, as the destination MAC address, in addition to setting a specific inherent multi-cast address, as the Ether-type, a specific fixed value is set. Note that as the sending source MAC address, as in the past, the sending source port physical MAC address or the device MAC is set.

By doing this, at the receiving side provider edge or customer edge, the destination MAC address of the transferred packet is detected, this is a specific inherent multi cast address, and after the Ether-type is detected and it is confirmed that this is a specific inherent value, that packet is recognized as the BFD packet, and is taken in.

By using this kind of constitution, with this embodiment, it is also possible to use the BFD at layer 2.

Figure 5:
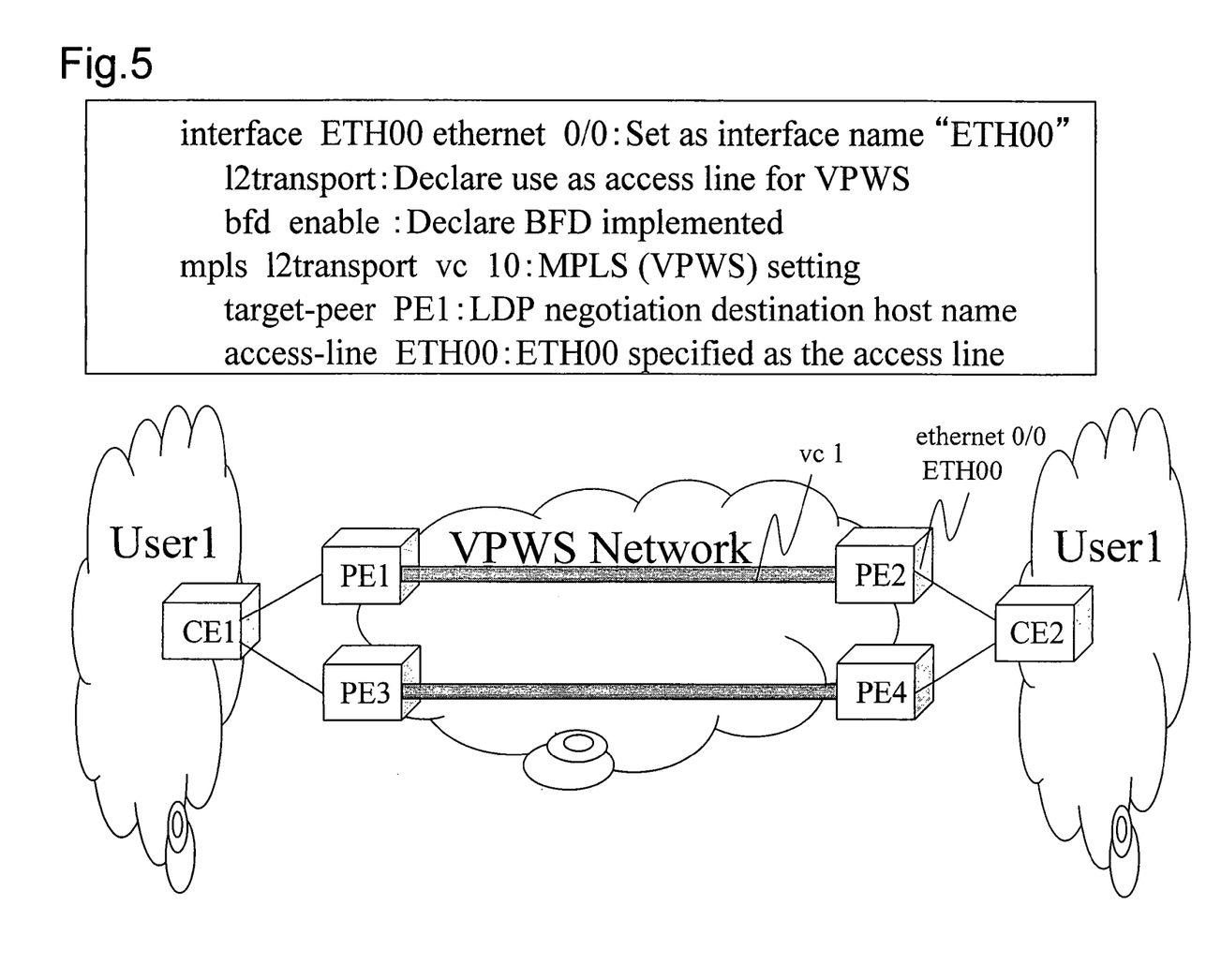
FIG. 5 is an explanatory drawing showing one example of the configuration information to be set in the provider edge PE2.

Here, FIG. 5 is shows one example of the configuration information to be set in the provider edge PE2. By setting this kind of configuration information at the provider edge PE2 or the like, it is possible to realize the operation described below.

As described above, with this embodiment, the feature is the point of the BFD operating between each CE and PE. Note that with the prior art as well, as described previously, there was an example of operating the reachability verification protocol between the customer edges (between CE1 and CE2), but with this embodiment, the difference point is that the BFD operates not between the customer edges but rather between each CE and PE.

B-2: Operation During Access Line Failure Occurrence

Figure 6:
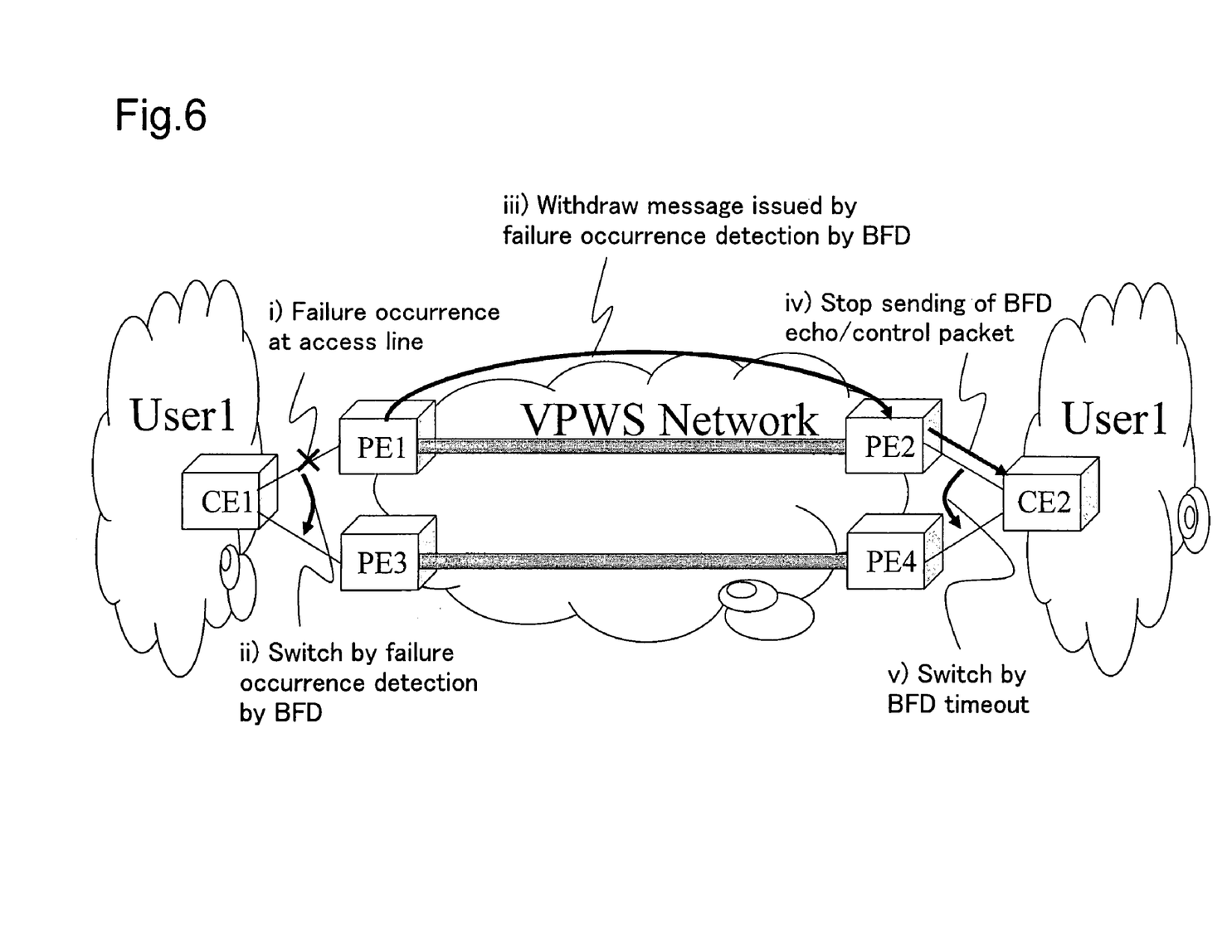
FIG. 6 is an explanatory drawing showing the operation contents during access line failure occurrence for the second embodiment of the invention.

FIG. 6 is an explanatory drawing showing the operation contents during access line failure occurrence for the second embodiment of the invention.

In light of this, for example as shown in FIG. 6, when a failure such as one-line disconnect or the like occurs at the access line AL1 between CE1 and PE1 (step i), the BFD is operating between CE1 and PE1, so with the control unit of the customer edge CE1, the failure occurrence at the access line AL1 is detected by that BFD, and the redundancy control protocol operating with the customer edge CE1 switches from the normal path to the redundant path (step ii). Meanwhile, with the control unit of the provider edge PE1 as well, the occurrence of failure such as a one-line disconnect or the like at the access line AL1 is detected by the BFD. With the control unit of the provider edge PE1, when the occurrence of failure at the access line AL1 is detected, the same as with the first embodiment, the virtual circuit VC1 built between PE1 and PE2 is put to a down state by the aforementioned LDP, so a label withdraw message is issued to PE2 (step iii).

Figure 7:
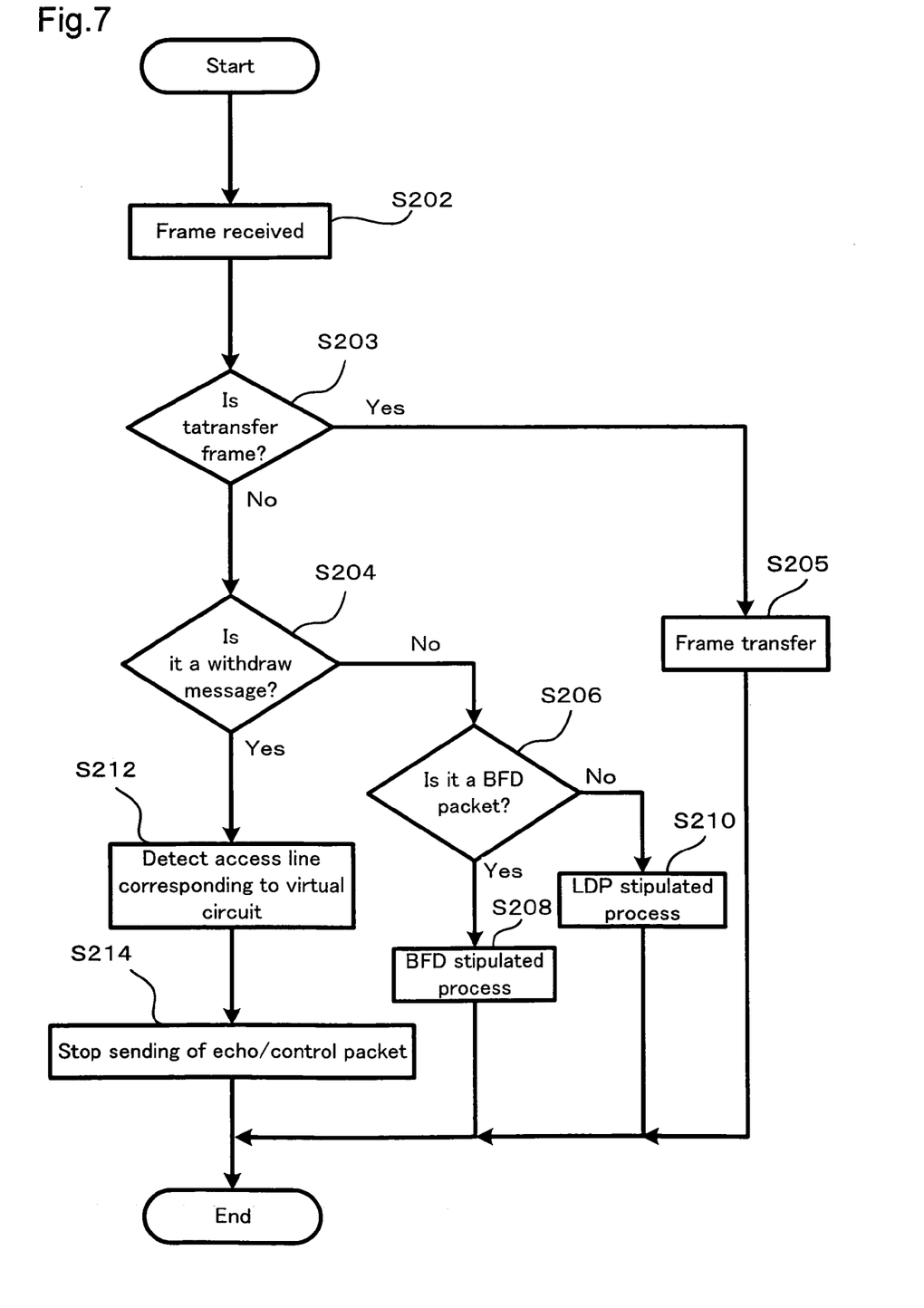
FIG. 7 is a flow chart showing the process operation of the provider edge PE2 for the second embodiment of the invention.

In contrast to this, the control unit of the other provider edge PE2 performs the kind of process operation shown in FIG. 7. FIG. 7 is a flow chart showing the process operation of the provider edge PE2 for the second embodiment of the invention.

When the process shown in FIG. 7 starts, when the control unit of the provider edge PE2 receives the frame via the line (step S202), a judgment is made of whether or not that frame is a transfer frame (step S203), and when it is a transfer frame, frame transfer is performed (step S205), and the series of processes ends. When it is not a transfer frame, a judgment is made of whether or not that frame contains a label withdraw message (step S204), and when it is not contained, this time a judgment is made of whether or not that frame contains a BFD packet (step S206). As a result of the judgment, when a BFD packet is contained, the BFD stipulated process corresponding to that is executed (step S208), and when it is not contained, the LDP stipulated process is executed (step S210), and the series of processes ends. Meanwhile, when the label withdraw message is contained in the received frame, the access line AL2 corresponding to the virtual circuit VC1 to which that label withdraw message was sent is detected (step S212), and sending of the BFD echo/control packets to the access line AL2 between the PE2 and CE2 obtained by detection is stopped (step S214, FIG. 6 step iv), and the series of processes ends.

As a result, with the control unit of the customer edge CE2 connected to the access line AL2, the timeout of the BFD echo/control packet is detected for the access line AL1, and the redundancy control protocol operating with the customer edge CE2 switches from the normal path to the redundant path (step v).

B-3: Effect of the Embodiment

As described above, with this embodiment, by operating the BFD between CE and PE, even if the failure that occurred at the access line between CE and PE is a failure other than link down, such as a one-line disconnect or the like, it is possible for the customer edge and the provider edge to detect that failure occurrence.

Also, for this embodiment, though the BFD which is the reachability verification protocol is operated between each CE and PE, it is not operated between the provider edges (between PE1 and PE2), so within the MPLS network (VPWS network), there is no frequent exchange of echo packets. Also, the same as with the first embodiment, when failure occurs at the other party access line, within the MPLS network (VPWS network), using the LDP label withdraw message, notification of the failure occurrence is given from one provider edge to the other provider edge. Therefore, according to this embodiment, it is possible to give notification in a short time from the failure occurrence without compression of the communication bandwidth within the network.

Also, the provider edge that received the label withdraw message immediately stops sending of the BFD echo/control packet to its own access line, and by doing that, at the customer edge, the timeout of the BFD echo/control packet is detected for its own access line, and the failure occurrence at the other party access line is detected, so it is possible to significantly shorten the time it takes for failure occurrence detection.

C. Variation Example

Note that the present invention is not limited to the aforementioned embodiments and aspects, and it is possible to implement various aspects within a scope that does not stray from its key points.

Now then, with the aforementioned second embodiment, the provider edge that received the label withdraw message stops the sending of the BFD echo/control packet, and by the customer edge detecting the timeout of that echo/control packet, the failure occurrence at the other party access line is made to be detected, but instead of this, it is also possible to use a notification function using the BFD control packet.

Figure 8:
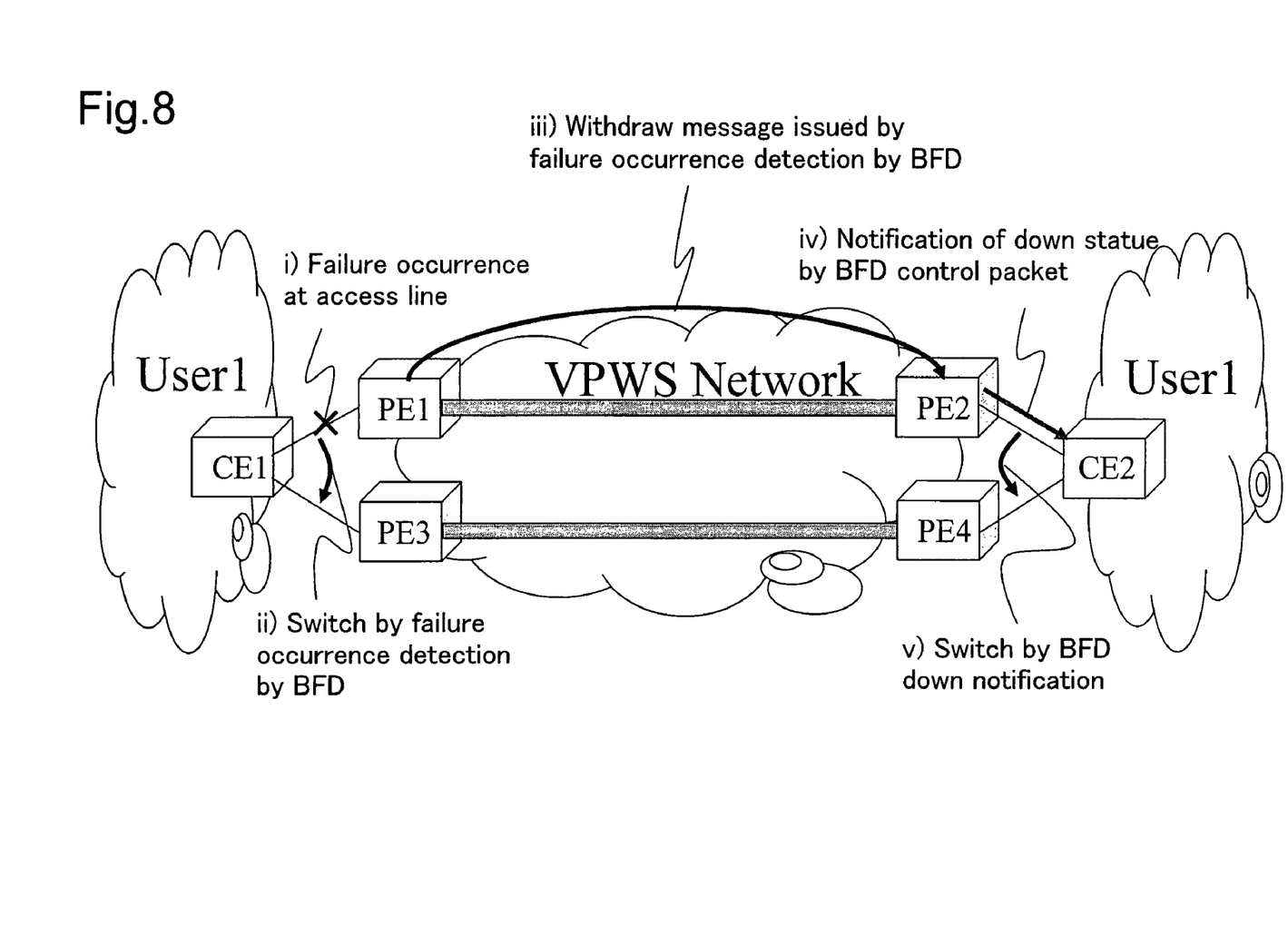
FIG. 8 is an explanatory drawing showing the operation contents during access line failure occurrence for a variation example.

Now we will describe a variation example for the aforementioned second embodiment. FIG. 8 is an explanatory drawing showing the operation contents during access line failure occurrence for the variation example.

In FIG. 8, the operation contents from the failure occurrence at the access line AL1 (step i) until the issuing of the label withdraw message to the provider edge PE1 (step iii) are the same as with the second embodiment shown in FIG. 6, so the description of these is omitted.

Figure 9:
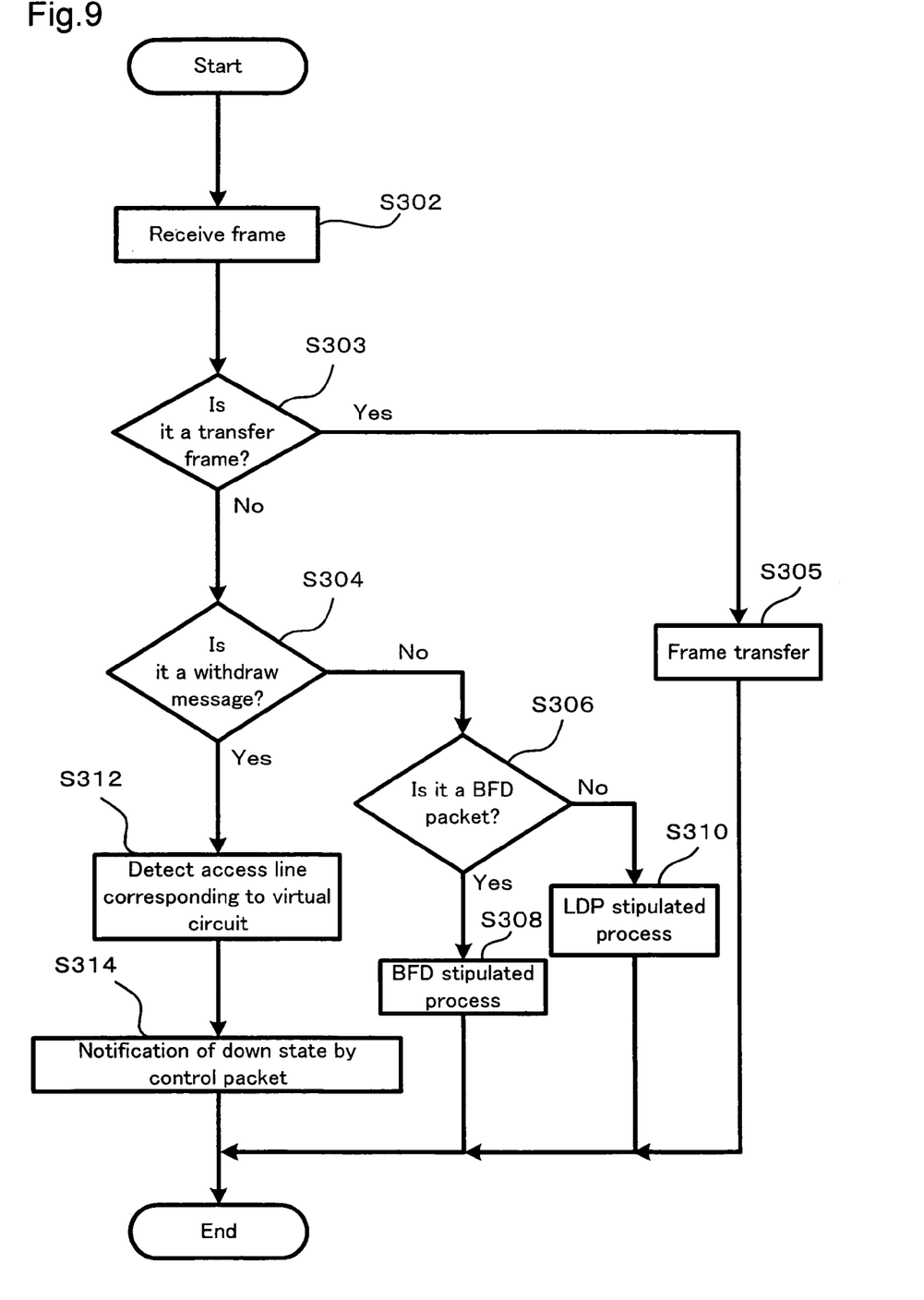
FIG. 9 is a flow chart showing the process operation of the provider edge PE2 for a variation example.

In contrast to this, the control unit of the other provider edge PE2 performs the kind of process operation shown in FIG. 9. FIG. 9 is a flow chart showing the process operation of the provider edge PE2 for the variation example.

With the process shown in FIG. 9, the process from step S302 to step S312 is the same as the process from step S202 to step S212 in the second embodiment shown in FIG. 7, so the description of these is omitted.

In FIG. 7, with the control unit of the provider edge PE2, when the received frame contains a label withdraw message and the access line AL2 corresponding to the virtual circuit VC1 to which that label withdraw message was sent is detected (step S312), notification of the down state is given by the BFD control packet (step S314, FIG. 8 step iv) to the access line AL2 between the PE2 and CE2 obtained by the detection, and the series of processes ends.

As a result, with the control unit of the customer edge CE2 connected to the access line AL2, when there is notification of a down state by the BFD control packet for the access line AL1, by doing this, the failure occurrence at the other party access line is detected, and the redundancy control protocol that operates at the customer edge CE2 switches from the normal path to the redundant path (step v).

By constituting in this way, even with this variation example, it is possible to exhibit the same effects as the second example.

Note that with the description above, an example was given of a point-to-point network constitution such as the VPWS network, but this can also be used in the same way for a point-to-multipoint network constitution such as the VPLS network.

What is claimed is:

1. A data communication system for performing data communication between a second and third network via a first network, the data communication system comprising:
    a first provider edge of the first network;
    a second provider edge of the first network connected to the first provider edge via a first virtual circuit of the first network;
    a third provider edge of the first network;
    a fourth provider edge of the first network connected to the third provider edge via a second virtual circuit of the first network;
    a first customer edge of the second network connected to the first provider edge via a first access line and connected to the third provider edge via a third access line; and
    a second customer edge of the third network connected to the second provider edge via a second access line and connected to the fourth provider edge via a fourth access line,
    wherein a path that passes through the first customer edge, the first provider edge, the second provider edge, and the second customer edge is constituted as a normal path, and a path that passes through the first customer edge, the third provider edge, the fourth provider edge, and the second customer edge is constituted as a redundant path,
    wherein the first network is a layer 2 VPN (Virtual Private Network) through which point-to-point data communication is performed using a VPWS (Virtual Private Wire Service) network,
    wherein at least a BFD (Bidirectional Forwarding Detection), which is a reachability verification protocol, is operated using a BFD packet, which is transferred between the first provider edge and the first customer edge and between the second provider edge and the second customer edge,
    wherein the BFD packet is set at a specific fixed multi-cast address as the destination MAC address, and is set at a specific fixed value as the Ether-type,
    wherein the first provider edge sends a virtual circuit withdraw message to the first virtual circuit when the first provider edge detects an occurrence of failure at the first access line by the BFD,
    wherein the second provider edge puts the second access line into a link down state by a BFD control packet when the second provider edge receives the virtual circuit withdraw message sent via the first virtual circuit, and
    wherein the second customer edge switches from the normal path to the redundant path when the second customer edge detects the link down of the second access line by the BFD control packet.

2. A data communication system for performing data communication between a second and third network via a first network, the data communication system comprising:
    a first provider edge of the first network;
    a second provider edge of the first network connected to the first provider edge via a first virtual circuit of the first network;
    a third provider edge of the first network;
    a fourth provider edge of the first network connected to the third provider edge via a second virtual circuit of the first network;

a first customer edge of the second network connected to the first provider edge via a first access line and connected to the third provider edge via a third access line; and a second customer edge of the third network connected to the second provider edge via a second access line and connected to the fourth provider edge via a fourth access line, wherein a path that passes through the first customer edge, the first provider edge, the second provider edge, and the second customer edge is constituted as a normal path, and a path that passes through the first customer edge, the third provider edge, the fourth provider edge, and the second customer edge is constituted as a redundant path, wherein the first network is a layer 2 VPN (Virtual Private Network) through which point-to-point data communication is performed using a VPWS (Virtual Private Wire Service) network, wherein at least a BFD (Bidirectional Forwarding Detection), which is a reachability verification protocol, is operated using a BFD packet, which is transferred between the first provider edge and the first customer edge and between the second provider edge and the second customer edge, wherein the BFD packet is set at a specific fixed multi-cast address as the destination MAC address, and is set at a specific fixed value as the Ether-type, wherein the first provider edge sends a virtual circuit withdraw message to the first virtual circuit, when a failure occurs at the first access line and the first provider edge detects the failure occurrence by the BFD, wherein the second provider edge stops sending of the BFD echo/control packet to the second access line when the second provider edge receives the virtual circuit withdraw message sent via the first virtual circuit, and wherein the second customer edge switches from the normal path to the redundant path when the second customer edge detects timeout of the BFD echo/control packet for the second access line.

3. The data communication system in accordance with claim 2, wherein the second provider edge sends a notification of a down state by the BFD control packet to the second access line rather than stopping the sending of the BFD echo/control packet when the second provider edge receives the virtual circuit withdraw message sent via the first virtual circuit, and wherein the second customer edge switches from the normal path to the redundant path when the second customer edge receives the notification of the down state by the BFD control packet from the second access line rather than detecting the timeout of the BFD echo/control packet.

4. The data communication system in accordance with claims 1 or 2, wherein the virtual circuit withdraw message is a label withdraw message stipulated by a LDP (Label Distribution Protocol).

5. A network device comprising:
a first provider edge of a first network,
wherein the first provider edge is connected to a second provider edge of the first network via a virtual circuit and is connected to a customer edge of a second network via an access line,
wherein the first network is a layer 2 VPN (Virtual Private Network) through which point-to-point data communication is performed using a VPWS (Virtual Private Wire Service) network, and wherein when the BFD (Bidirectional Forwarding Detection), which is the reachability verification protocol, is operated using a BFD packet, which is transferred between the first provider edge and the second provider edge, the first provider edge puts the access line into a link down state by the BFD control packet when a virtual circuit withdraw message sent from the second provider edge via the virtual circuit is received.

6. A network device comprising:
a first provider edge of a first network,
wherein the first provider edge is connected to a second provider edge of the first network via a virtual circuit and is connected to a customer edge of a second network via an access line,
wherein the first network is a layer 2 VPN (Virtual Private Network) through which point-to-point data communication is performed using a VPWS (Virtual Private Wire Service) network, and
wherein when the BFD (Bidirectional Forwarding Detection), which is the reachability verification protocol, is operated using a BFD packet, which is transferred between the first provider edge and the second provider edge, the first provider edge stops sending a BFD echo/control packet to the access line when a virtual circuit withdraw message sent from the second provider edge via the virtual circuit is received.

7. The network device in accordance with claim 6, wherein the network device sends a notification of a down state by the BFD control packet to the second access line, instead of stopping the sending of the BFD echo/control packet, when a virtual circuit withdraw message sent from the second provider edge via the virtual circuit is received.

8. A data communication method for performing data communication between a second and third network via a first network, the data communication method comprising the steps of:
providing a first provider edge of the first network;
providing a second provider edge of the first network connected to the first provider edge via a first virtual circuit of the first network;
providing a third provider edge of the first network;
providing a fourth provider edge of the first network connected to the third provider edge via a second virtual circuit of the first network;
providing a first customer edge of the second network connected to the first provider edge via a first access line and connected to the third provider edge via a third access line;
providing a second customer edge of the third network connected to the second provider edge via a second access line and connected to the fourth provider edge via a fourth access line,
wherein a path which passes through the first customer edge, the first provider edge, the second provider edge, and the second customer edge and is constituted as a normal path, and a path which passes through the first customer edge, the third provider edge, the fourth provider edge, and the second customer edge and is constituted as a redundant path;
wherein the first network is a layer 2 VPN (Virtual Private Network) through which point-to-point data communication is performed using a VPWS (Virtual Private Wire Service) network;
(g) operating at least the BFD, which is the reachability verification protocol, using a BFD packet between the first provider edge and the first customer edge and between the second provider edge and the second customer edge, wherein the BFD packet is set at a specific fixed multi-cast address as the destination MAC address, and is set at a specific fixed value as the Ether-type;

causing the first provider edge to send a virtual circuit withdraw message to the first virtual circuit when the first provider edge detects an occurrence of failure at the first access line by the BFD;

causing the second provider edge to put the second access line into a link down state by a BFD control packet when the second provider edge receives the virtual circuit withdraw message sent via the first virtual circuit; and causing the second customer edge to switch from the normal path to the redundant path when the second customer edge detects the link down of the second access line by the BFD control packet.

9. A data communication method for performing data communication between a second and third network via a first network, the data communication method comprising the steps of:

(a) providing a first provider edge of the first network;

(b) providing a second provider edge of the first network connected to the first provider edge via a first virtual circuit of the first network;

(c) providing a third provider edge of the first network;

(d) providing a fourth provider edge of the first network connected to the third provider edge via a second virtual circuit of the first network;

(e) providing a first customer edge of the second network connected to the first provider edge via a first access line and connected to the third provider edge via a third access line;

(f) providing a second customer edge of the third network connected to the second provider edge via a second access line and connected to the fourth provider edge via a fourth access line, wherein a path which passes through the first customer edge, the first provider edge, the second provider edge, and the second customer edge and is constituted as a normal path, and a path which passes through the first customer edge, the third provider edge, the fourth provider edge, and the second customer edge and is constituted as a redundant path, and wherein the first network is a layer 2 VPN (Virtual Private Network) through which point-to-point data communication is performed using a VPWS (Virtual Private Wire Service) network;

(g) operating at least the BFD, which is the reachability verification protocol, using a BFD packet between the first provider edge and the first customer edge and between the second provider edge and the second customer edge, wherein the BFD packet is set at a specific fixed multi-cast address as the destination MAC address, and is set at a specific fixed value as the Ether-type; (h) causing the first provider edge to send a virtual circuit withdraw message to the first virtual circuit, when a failure occurs at the first access line and the first provider edge detects the failure occurrence by the BFD;

(i) causing the second provider edge to stop sending of the BFD echo/control packet to the second access line when the second provider edge receives the virtual circuit withdraw message sent via the first access line; and (j) causing the second customer edge to switch from the normal path to the redundant path when the second customer edge detects timeout of the BFD echo/control packet for the second access line.

10. The data communication method in accordance with claim 9, wherein instead of the steps (i) and (j), the data communication method further comprises the steps of:

(m) causing the second provider edge to send a notification of a down state by the BFD control packet to the second access line when the second provider edge receives the virtual circuit withdraw message sent via the first access line; and (n) causing the second customer edge to switch from the normal path to the redundant path when the second customer edge receives the notification of the down state by the BFD control packet.

* * * * *